United States Patent [19]

Fung et al.

[11] Patent Number: 5,116,180

[45] Date of Patent: May 26, 1992

[54] HUMAN-IN-THE-LOOP MACHINE CONTROL LOOP

[75] Inventors: Patrick T. Fung, Willowdale; Graham Norgate, Oakville; Timothy A. Dilts, Newmarket; Andrew S. Jones, Toronto; Rangaswamy Ravindran, Bolton, all of Canada

[73] Assignee: Spar Aerospace Limited, Weston, Canada

[21] Appl. No.: 518,471

[22] Filed: May 3, 1990

Related U.S. Application Data

[63] Continuation-in-part of Ser. No. 219,789, Jul. 18, 1988, abandoned.

[51] Int. Cl.5 .............................. B25J 3/00
[52] U.S. Cl. .......................... 414/5; 414/909; 901/9; 74/471 XY; 74/523
[58] Field of Search ............ 901/8, 9, 49; 414/2, 414/4, 5, 6, 730; 909; 244/233, 234, 236, 237; 74/471 XY, 523, 491

[56] References Cited

U.S. PATENT DOCUMENTS

| | | | |
|---|---|---|---|
| 3,409,252 | 11/1968 | Miller | 244/237 |
| 3,733,039 | 5/1973 | O'Connor et al. | 244/223 X |
| 4,150,803 | 4/1979 | Fernandez | 74/471 XY X |
| 4,160,508 | 7/1979 | Salisbury, Jr. | 414/4 |
| 4,298,308 | 11/1981 | Richter | |
| 4,641,251 | 2/1987 | Inoue | 901/46 X |
| 4,661,032 | 4/1987 | Arai | 414/5 |
| 4,831,531 | 5/1989 | Adams et al. | 414/5 X |

FOREIGN PATENT DOCUMENTS

| | | |
|---|---|---|
| 0019596 | 11/1980 | European Pat. Off. |
| 0051387 | 5/1982 | European Pat. Off. |
| 0080416 | 11/1982 | European Pat. Off. |
| 1531181 | 7/1969 | Fed. Rep. of Germany |
| 3045094 | 7/1982 | Fed. Rep. of Germany |
| 1154538 | 4/1958 | France |
| 2027678 | 1/1970 | France |
| 2275833 | 6/1974 | France |
| 2297698 | 1/1975 | France |
| 2139183 | 5/1990 | Japan ........................... 901/9 |

OTHER PUBLICATIONS

Kohler, G. W. et al. "Elektrocho Master-Slave Manipulator", Atomkernenergie, vol. 48, No. 4, 1986, pp. 251–254.

"Manipulator Systems Extend Man's Capabilities in Space", Deutsch et al. *Astronautics and Aeronautics*, Jun. 1972.

*Primary Examiner*—Robert J. Spar
*Assistant Examiner*—William M. Hienz
*Attorney, Agent, or Firm*—Fetherstonhaugh & Co.

[57] ABSTRACT

In a human-in-the-loop robotic control loop, the constrained forces and moments at the gripper (also called hand or end effector) of the manipulator are measured by a force-mement sensor. The resulting force and moment signals are scaled and fed as input voltages to motors in a hand controller to provide torques which oppose deflection of the hand controller. Thus, the operator feels the opposing torques which are proportional to the magnitude of the constrained forces and moments. The force feedback loop may be opened to selectively provide a passive control loop. In either the active or passive mode, the hand controller position signals may be selectively mapped to either gripper position signals or gripper velocity signals in order to control movement of the gripper in the desired manner.

18 Claims, 5 Drawing Sheets

HUMAN-IN-THE-LOOP MACHINE CONTROL LOOP

RELATED APPLICATIONS

This application is a Continuation-in-part of U.S. patent application Ser. No. 219,789 filed Jul. 18, 1988, now abandoned.

This invention relates to a human-in-the-loop control loop for a machine having a movable operative part, such as the gripper of a robotic manipulator.

BACKGROUND OF THE INVENTION

Fully automated robotic control has been utilised in many industrial applications, but there are still many applications where such a technique is not sufficiently mature to be applied. The main reason is the lack of an intelligent and stable control system that can operate effectively when unscheduled tasks and unpredictable disturbances appear. Another reason is that the software modelling of a task and a workspace is usually very complex so that in many circumstances such modelling is not practical. Where automated robotic control is not practical, the conventional human-in-the-loop control method is the alternative because the human operator in the control loop is capable of generating control signals adaptive to task and workspace variations. A human operator creates a control loop even where the only feedback to him is visual—he can adapt his control signals according to what he sees the robot doing.

The control input device for a human-in-the-loop system varies according to the human engineering factors and the nature of the applications. For resolved rate control and resolved position control, a commonly used input device is a passive hand controller comprising a pair of three degree-of-freedom joysticks, one for translational control and one for rotational control.

Where the gripper of the manipulator experiences constrained forces, it is essential that the constrained forces be controlled effectively. One known method to control forces in the human-in-the-loop system is to measure the forces and display them graphically or numerically. The operator watches the displayed forces as he/she regulates the manipulator through the passive hand controller. This is called force feedback via vision. This method can only be used in a very slow control system because of the time delay in displaying the force and the time lag in the vision feedback and interpretation process. Other disadvantages of this method are that it requires the operator to watch the manipulator operation as well as the displayed forces, hence it may divert the operator's attention and cause excess operator strain.

Another method is to reflect the forces encountered by the manipulator through a hand controller to provide force feel for the operator. The operator can then control the encountered forces by adjusting the hand controller position, which is interpreted as the manipulator command signal. This method does not require a visual display of the forces, hence the operator can concentrate on the motion of the manipulator. Master-slave control has been the conventional method to reflect the forces encountered by the manipulator in the last thirty years. The method requires two identical or scaled manipulators, one (the master) being moved by an operator as a hand controller for generating command signals and reflecting forces, and the other for performing the task. Master-slave control uses the discrepancies between joint positions of the master manipulator and the corresponding joint position of the slave arm to generate force signals. This system is expensive and requires a large workspace. The master arm (control input device) kinematics are unique to a particular slave arm, hence the master arm cannot be used with other types of manipulators. Furthermore, the mechanical system is very complicated and can only handle small payloads (up to about 50 pounds).

The characteristics of the master-slave system do not meet present advanced manipulator control needs, for example the control of large robots in space.

Recently, two new force reflecting hand controllers have been developed. These are the six Degree Of Freedom (DOF) Universal Force Reflecting Hand Controller of JPL (Jet Propulsion Laboratory), and the 9-String 6-DOF Force Reflecting Hand Controller of the University of Texas at Austin. The former hand controller consists of a set of pulleys and cables to transmit joint motor torques to the handle. The latter hand controller uses cables and cylinders to transmit joint motor torques to the handle. Both hand controllers suffer the drawback that the dynamic characteristics of the cables, pulleys and cylinders disturb the force feedback loops. Other drawbacks of these hand controllers are that the torque transmission mechanisms have significant friction, the mechanical system and the software are complex, and the physical sizes, though small as compared with the master arm of the master-slave system, are still relatively large.

Further, in no known active (i.e., force reflecting) human-in-the-loop control loop is it possible to emulate a smooth passive (i.e., non-force reflecting) human-in-the-loop control loop. For some applications, for example in manual augmented (resolved rate) control of the remote manipulator of NASA's space shuttle, this feature is essential.

Consequently, there remains a need for a machine control loop capable of reflecting forces encountered at the operative part of the machine in a hand controller that avoids the problems and the drawbacks of known systems.

SUMMARY OF THE INVENTION

Accordingly, there is provided a human-in-the-loop control loop for a machine having a plurality of joints and an operative part, said plurality of joints for moving said operative part, comprising a hand controller having at least one degree of freedom so as to be deflectable in order to provide hand controller position signals for moving said operative part, said hand controller, in each degree of freedom, controlling motion of said operative part along one path; position mapping means to map each of said hand controller position signals to an operative part position command signal indicative of a position for said operative part along each of said at least one path; velocity mapping means to map each of said hand controller position signals to an operative part velocity command signal indicative of a velocity for said operative part along each of said at least one path; selector means to selectively activate either said position mapping means and deactivate said velocity mapping means or activate said velocity mapping means and deactivate said position mapping means; and resolving means responsive to said selector means for resolving operative part position command signals to joint command signals and operative part velocity command signals to joint command signals for controlling the movement of each of said joints.

BRIEF DESCRIPTIONS OF THE DRAWINGS

DESCRIPTION OF PREFERRED EMBODIMENTS

Figure 1:
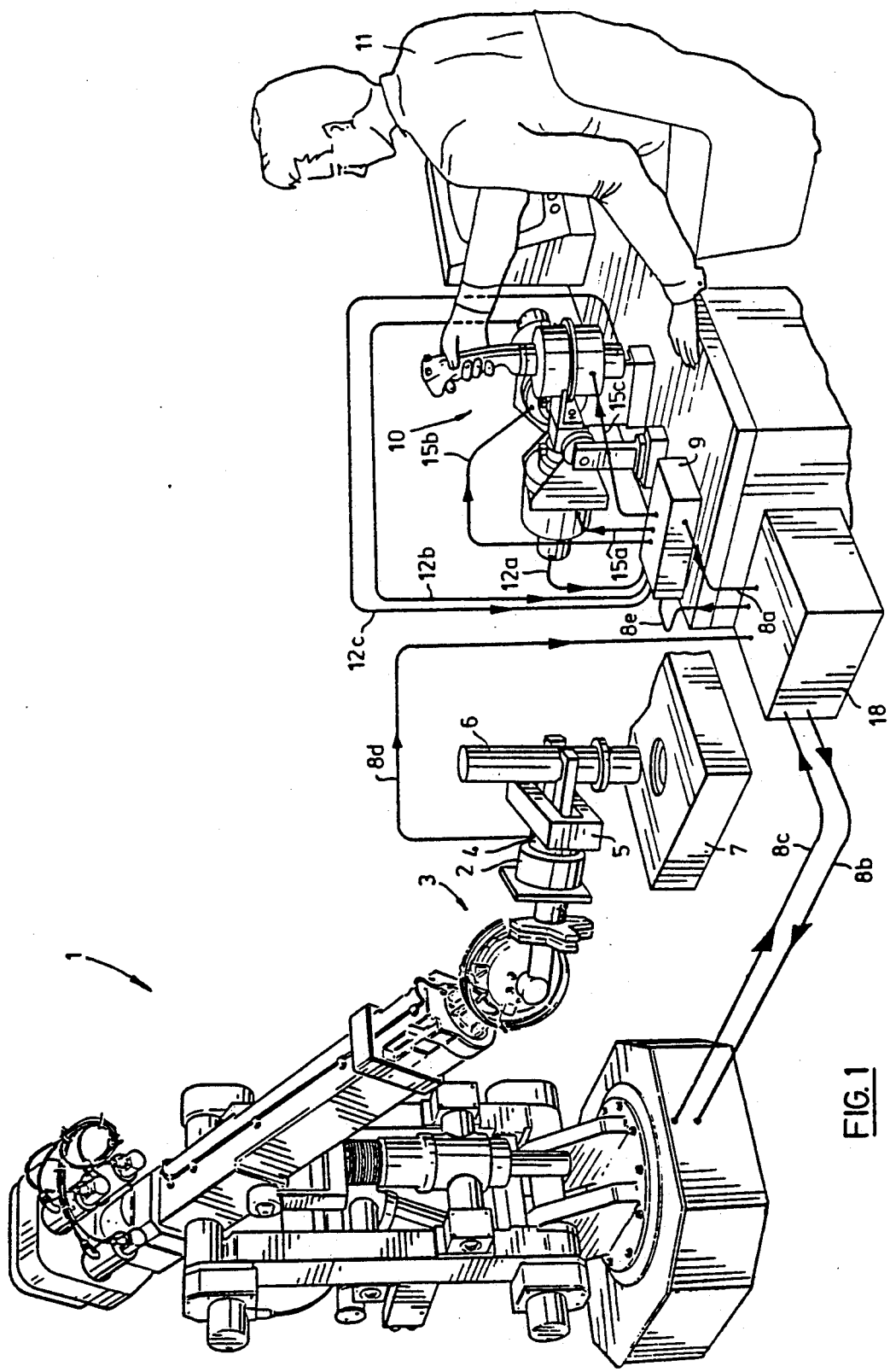
FIG. 1 is a schematic perspective view of a robotic manipulator controlled by a human operator and incorporating an embodiment of the control loop of this invention.

FIG. 1 is an illustration of an embodiment of the control loop of this invention. A robotic manipulator is illustrated generally at 1. A compliance device 2 is mounted proximate the wrist joint 3 of the manipulator and supports force-moment sensor 4. The force-moment sensor in turn supports a gripper 5 which is the operative part of the manipulator and is shown gripping a workpiece 6 above a second workpiece 7. A hand controller indicated generally at 10 is manipulable by an operator 11. The position of the hand controller is output as hand controller position signals on lines 12a, 12b and 12c which input controller 9. Processed hand controller position signals from controller 9 output on line 8a to computer 18. Control signals to the manipulator joints pass along line 8b. Line 8b originates in the computer 18 which houses manipulator control software and hand controller software. Robotic manipulator 1 joint position signals input the computer 18 along line 8c. The force-moment signals measured by the force-moment sensor 4 are transmitted to the computer 18 through line 8d. Controller 9 houses the electronics of the analogue control loop of this invention. The computer 18 outputs feedback control signals to the controller 9 on line 8e. Controller 9 outputs feedback control signals to the hand controller on lines 15a, 15b and 15c.

Figure 2:
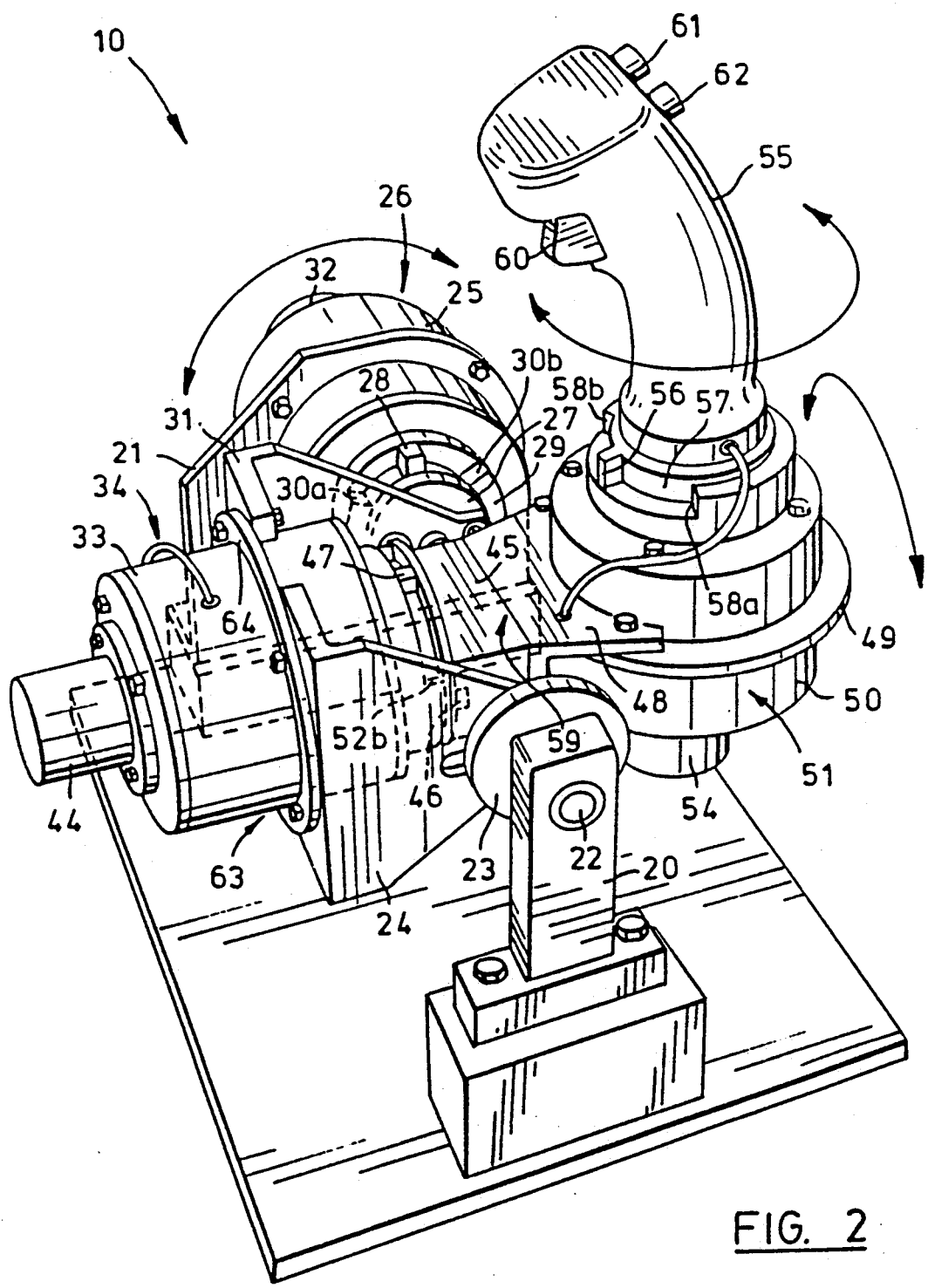
FIG. 2 is a perspective view of an embodiment of a hand controller constructed according to this invention.
Figure 3:
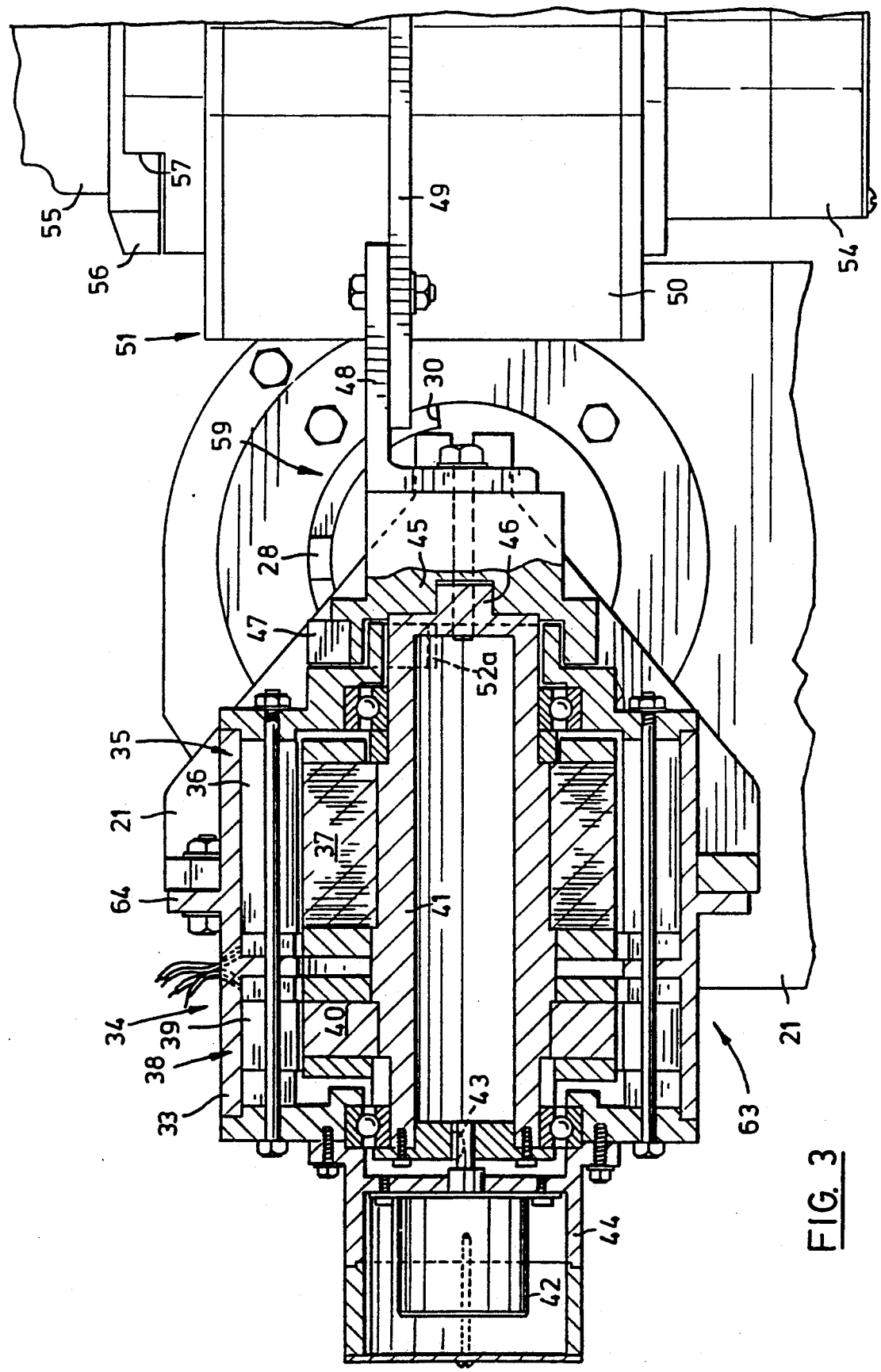
FIG. 3 is a partial cross sectional view of a portion of the hand controller of FIG. 2.

Hand controller 10 is depicted in greater detail in FIGS. 2 and 3. Two upstanding supports 20 and 21 form the base for the hand controller. Axle 22 is rotatably supported by upstanding support 20 and terminates in disk 23. Disk 23 is bolted to cradle member 24. A flange on casing 25 of motor/tachometer 26 is bolted to upstanding support 21. A peg 28 is formed at one end of common rotor shaft 27 of motor/tachometer 26. Peg 28 protrudes radially outwardly from common rotor shaft 27. Casing 25 terminates in arcuate piece 29, the ends of which constitute stops 30a and 30b which are in the path of peg 28 when common rotor shaft 27 rotates. The end of common rotor shaft 27 which supports peg 28 is bolted to cradle member 31. The other end of the common rotor shaft 27 is keyed to a potentiometer housed in housing 32. The internal structure of the motor/tachometer 26 and the potentiometer housed in housing 32 is identical to that of motor/tachometer 34 and potentiometer 42, and is described hereinbelow in conjunction with FIG. 3.

Cradle members 24 and 31 cradle casing 33 of motor/tachometer 34. The cradle members are bolted to flange 64 of casing 33.

As seen in FIG. 3, casing 33 houses stator 36 and rotor 37 of motor 35 and stator 39 and rotor 40 of tachometer 38. Motor 35 is a d.c. brush motor and acts as a torque generator. Common rotor shaft 41 is affixed to rotors 37 and 40. Potentiometer 42 is keyed to one end of common rotor shaft 41 by key 43 on the common rotor shaft. A housing 44 surrounds the potentiometer. A mounting block 45 is keyed at the other end of common rotor shaft 41 by diametrically opposite keys on the common rotor shaft, one of which is indicated at 46. A peg 47 is formed at this other end of common rotor shaft 41 between stops 52a and 52b (seen in FIG. 2) of casing 33.

Angle iron 48 is bolted between mounting block 45 and flange 49 of casing 50 of motor/tachometer 51. Together, the mounting block 45 and angle iron 48 comprise forearm 59. Forearm 59 with casing 33 and housing 44 comprises arm 63.

The internal structure of motor/tachometer 51 and the potentiometer housed within housing 54 is identical to that described in connection with motor/tachometer 34 and potentiometer 42. Thus, the common rotor shaft 57 of motor/tachometer 51 is keyed at one end to the potentiometer housed in housing 54. Common rotor shaft 57 is keyed at its other end to joystick 55. A peg 56 is formed on the common rotor shaft 57 at the joystick end between stops 58a and 58b of casing 50.

Motor position feedback switch 60 is located proximate the free end of the joystick 55 as is velocity/position mode control switch 61 and active/passive mode switch 62. Motor position feedback mode switch 60 is spring loaded to the "on" mode.

The motors (torque generators) of the hand controller are fed with feedback control signals on lines 15a, 15b and 15c of FIG. 1 and the tachometers output on these lines. The potentiometers of the hand controller provide hand controller position signals on lines 12a, 12b and 12c of FIG. 1.

From the foregoing description, it will be clear that an operator may grasp the joystick 55 and, by deflecting it laterally, rotate forearm 59 until peg 47 abuts stop 52a or 52b. In so doing, common rotor 41 rotates, moving the rotor 40 of tachometer 38 and rotor 37 of motor 35, and adjusting potentiometer 42. Similarly, deflecting the joystick vertically will tilt arm 63 in cradle members 24 and 31, moving peg 28 between stops 20a and 30b and rotating the common rotor 27 of motor/tachometer 25. Also similarly, the joystick 55 may be twisted, moving peg 56 between stops 58a and 58b and rotating the common rotor 57 of motor/tachometer 50. Thus, the hand controller has three degrees of freedom and may be deflected in any of these degrees of freedom to provide hand controller position signals and hand controller angular momentum signals relating to each degree of freedom via the three potentiometers and three tachometers in the hand controller. Each of the three degrees of freedom of the joystick controls one of the directions of movement for the gripper (5 of FIG. 1)—i.e. its lateral, vertical, or forward-and-back motion.

Figure 4:
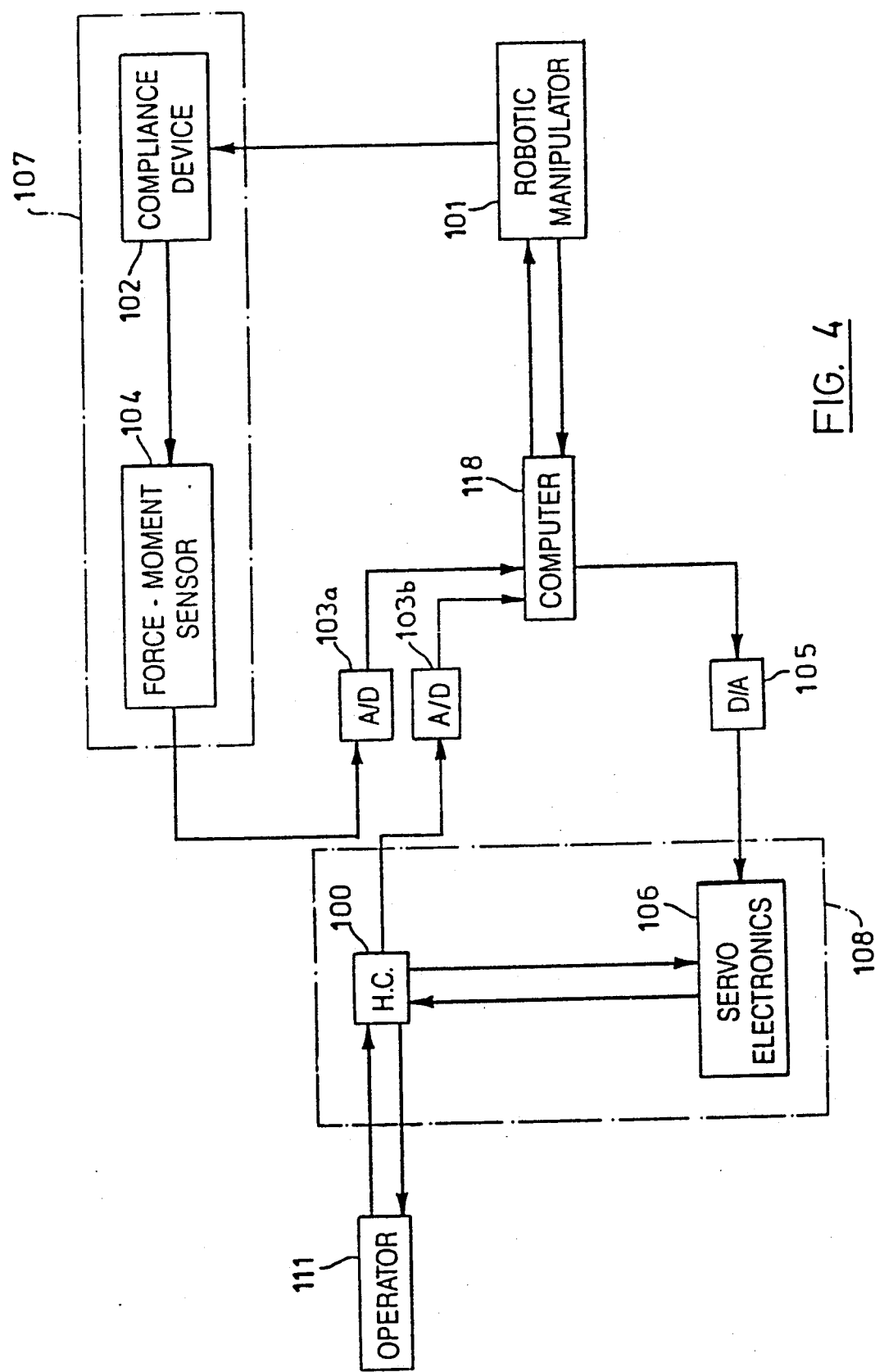
FIG. 4 is a block diagram of an embodiment of a robotic control loop constructed according to this invention.

FIG. 4 is a block diagram of the control loop of this invention incorporating the aforedescribed hand controller, the hand controller being shown in block form at 100. The hand controller interacts with an operator illustrated in block form at 111. That is, the operator 111 supplies input torques to the joystick of the hand controller and torques may be reflected back to the operator via the joystick. The hand controller 100 is connected for 2-way communication with servo electronics illustrated at 106. The servo electronics are housed in the controller 9 of FIG. 1. The hand controller 100 and servo electronics 101 comprise an input and feedback block 108. Output signals from the hand controller, as well as feeding the servo electronics 106, input analogue to digital converter 103b. Analogue to digital converter 103b inputs the computer (18 of FIG. 1) which is illustrated in block form at 118. The computer 118 outputs to robotic manipulator 101 (1 of FIG. 1). The robotic manipulator 101 feeds back position signals to the computer. Further, the manipulator 101 inputs synthesis and sensor signal block 107. In this example embodiment, the synthesis of sensor signal block comprises compliance device 102 (2 of FIG. 1), which receives as input the constrained forces at the gripper of the robotic manipulator and force/moment sensor 104 (4 of FIG. 1), which are input by the compliance device. The force/moment sensor 104 outputs a force feedback signal to computer 118 via analogue to digital converter 103a. The computer processes the feedback signal and outputs the processed feedback signal to digital to analogue converter 105 which in turn outputs to servo electronics block 106 of input and feedback block 108.

The details of construction of the compliance device 102 and force/movement sensor 104 are well known to those skilled in the art.

Figure 5:
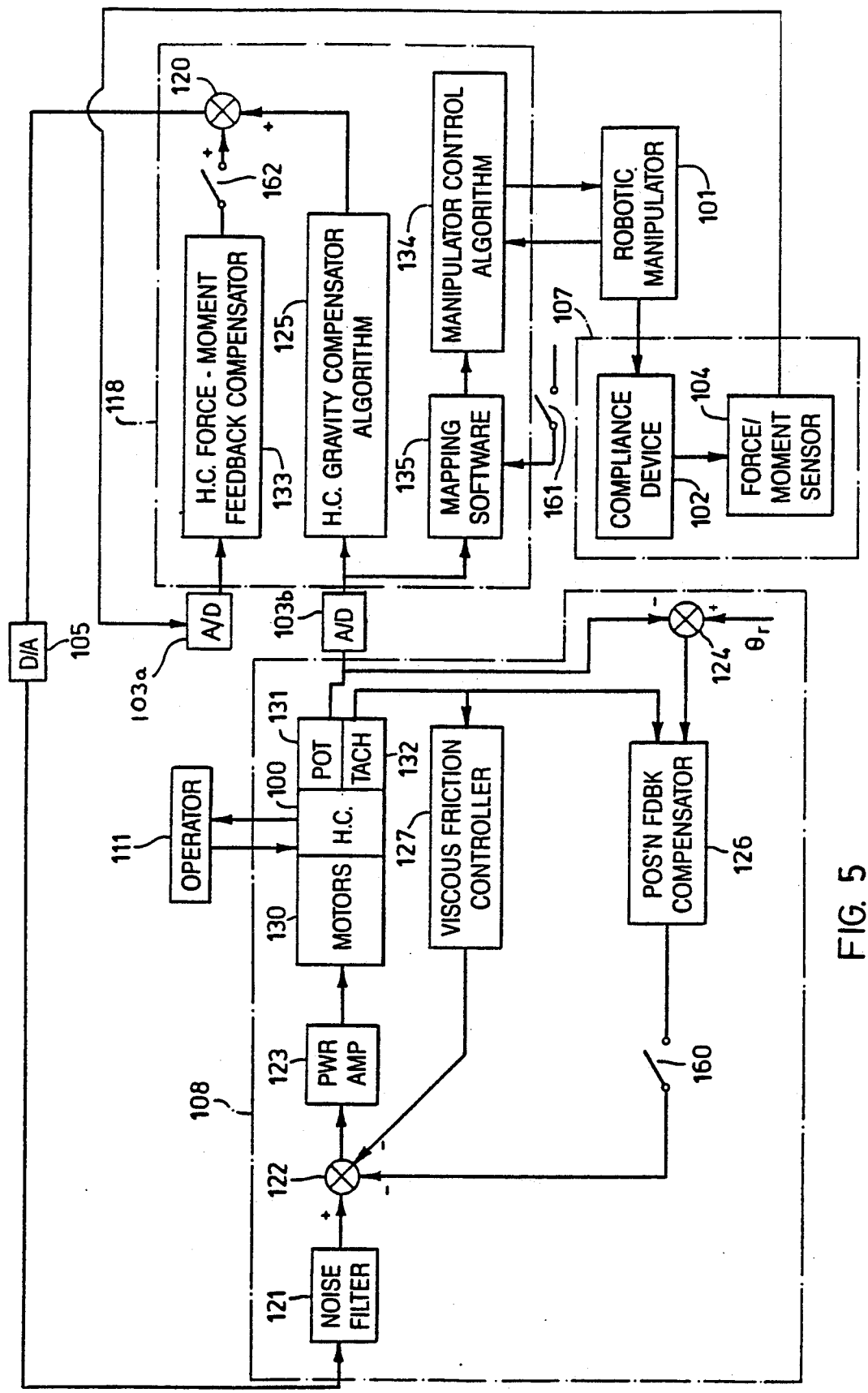
FIG. 5 is a detailed block diagram of the robotic control loop of FIG. 4.

FIG. 5 further details the control loop of FIG. 4. Input and feedback block 108 includes noise filter 121 which inputs summing junction 122. The output of this summing junction inputs power amplifier 123 and the power amplifier outputs to the torque generating motors 130 of the hand controller 100. The potentiometers 131 of the hand controller input both the computer 118 (via the analogue/digital converter 103b) and an input of summing junction 124. A reference angle (for each degree of freedom of the hand controller) forms the other input of summing junction 124. Summing junction 124 outputs to position feedback compensator 126. The tachometers 132 of the hand controller output to viscous friction controller 127 and the position feedback compensator 126. The position feedback compensator outputs through position feedback control switch 160 (60 of FIG. 2) to a negative input of summing junction 122. Similarly, the viscous friction controller outputs to a negative input of summing junction 122.

The computer 118 includes a hand controller force-moment feedback compensator algorithm at block 133 which receives as input the output of analogue to digital converter 103a. Block 133 outputs via switch 162 (62 of FIG. 2) to summing junction 120. Hand controller gravity compensator algorithm at block 125 also receives as input the output of analogue to digital converter 103b and outputs to the second input of summing junction 120. Summing junction 120 outputs from the computer to digital to analogue converter 105. Mapping software at block 135 is also input from analogue to digital converter 103b and this software also receives signals from switch 161 (61 of FIG. 2). The mapping software block 135 outputs to manipulator controller algorithm block 134. Block 134 is connected for two way communication with the robotic manipulator 101.

The details of construction of the noise filter 121, power amplifier 123, viscous friction controller 127, position feedback compensator 126 and gravity compensator 125 are well known to those skilled in the art.

Switches 160, 161 and 162 are operated by switches 60, 61, and 62, respectively of the hand controller of FIG. 2.

The control loop allows the hand controller to operate in the following modes:

(1) active mode with position control;
(2) active mode with rate control;
(3) passive mode with position control; and
(4) passive mode with rate control.

In this regard "Active mode" means the hand controller force feedback loop is activated (on) and "passive mode" means the hand controller force feedback loop is deactivated (off).

The operation of the control system in each mode is now described absent the effect of the loop containing the gravity compensator block 125 and the loop containing the viscous friction controller 127; these loops are later described since they affect the operation in all modes.

With reference to FIG. 5, to enter the active mode, active/passive mode switch 162 is closed (by the operator depressing switch 62 shown in FIG. 2 on joystick 55). For active mode with manipulator position control, position/velocity mode control switch 161 (controlled by switch 61 shown in FIG. 2 on the joystick) is set to manipulator position control mode and the motor position feedback switch 160 (controlled by switch 60 shown in FIG. 2 on the joystick) is set to its open (off) position.

With these switch settings, when the operator 111 manipulates the hand controller 100, hand controller position signals, which are measured by the potentiometers 131 in the hand controller, are sent to analogue to digital converter 103. The digitised position signals from the analogue to digital converter 103 input computer 118. Since position/velocity control switch 161 is in position control mode, the digitised position signals are mapped by the mapping software 135 of computer 118 to corresponding manipulator gripper position command signals, which are then resolved by the manipulator control algorithm 134 to obtain joint command signals for the robotic manipulator. In this representative embodiment, the directional forces (vector forces) encountered at the gripper (5 in FIG. 1) are reflected in the compliance device 102 in a manner which is measurable by the force/moment sensor 104 associated with the compliance device 102. The measured forces are output as directional force signals from the force/moment sensor to computer 118 where they are processed and output as processed force signals. Except as described hereinafter, these processed force signals are proportional to the forces encountered at the gripper lying along each direction of motion controlled by the hand controller. The processed force signals from computer 118 are, after appropriate modification, used as hand controller torque generator (motor) control signals. More particularly, the processed force signals input digital to analogue converter 105 where they are converted to equivalent analogue processed forces signals. These signals are then filtered in bandwidth (noise) filter 121 and are amplified by power amplifier 123 and then input the motors 130 of the hand controller 100 as motor control signals. As a result, the force signal representing a scaled version of the component of the force vector at the gripper lying along a direction of motion of the gripper controlled by a given DOF (Degree-of-Freedom) of the hand controller inputs the motor associated with the given DOF of the hand controller as a control (voltage) signal. This control signal generates a torque in the rotor of the hand controller motor which is in opposition to the deflection by the operator of the hand controller in the given DOF. Thus, the opposing torques are felt by the operator as a force opposing his deflection of the joystick. It will be clear to the skilled reader that this system reflects forces smoothly without backlash or mechanical noise.

For active mode with rate control, force feedback switch 162 is again closed and position/velocity control switch 161 is set to velocity control. The operation of the force feedback loop is identical to that described in connection with the position control mode except that the hand controller position signals input to the computer 118 are mapped to corresponding manipulator gripper velocity command signals for controlling the velocity (i.e. the rate and direction of movement) of the gripper. These signals are then resolved by the manipulator control algorithm 134 to obtain joint command signals for the robotic manipulator. As well, in this mode a motor position feedback loop is introduced as the operator 111 releases switch 60 of FIG. 2 thereby closing switch 160. The operation of the motor position feedback loop is as follows. The hand controller position signals are fed to a negative input of summing junction 124. A reference angle for each degree of freedom of the hand controller is fed to a positive input of the summing junction 124. The difference signal is fed to position feedback compensator 126. Signals representing the rate of rotation of the hand controller in each of its degrees of freedom are generated by the tachometers 132 in the hand controller and are also fed to the position feedback compensator 126 in order to add damping to the motor position feedback loop. The output of the position feedback compensator 126 is negatively fed back to the power amplifier 123 via summing junction 122 and the amplified feedback signals are input to the motors 130 of the hand controller to generate torques opposing the deflection of the joystick from the reference angle position in each of its degrees of freedom. The effect is equivalent to spring loading the joystick so that when it is deflected from its rest position it tends to move back to that position. The spring effect also resists movement of the joystick away from the rest position which allows the operator more precise control of the stick. By use of an "electronic" spring, the spring constant is easily adjustable through an adjustment to the position feedback compensator and, as well, non-linearities may be introduced, if desired. Further, the reference angle may be changed to alter the rest position of the joystick, however, normally the rest position is chosen as that which defines a zero rate of movement for the gripper.

In processing the force signals, as before-mentioned, the computer 118 generally scales same to provide processed force signals which reflect forces in the joystick of the hand controller of appropriate strength. For some applications, however, the computer may be programmed to map the measured force signals so as to emphasize or diminish forces in some directions. For example, with the robotic manipulator used as shown in FIG. 1 to insert workpiece 6 vertically into workpiece 7, it may be desired to emphasize vertical forces.

For many applications it is also desirable to program the computer to, in certain situations, derive the processed force signal directly from the computed manipulator position rather than from the measured force signal. This is appropriate when, for example, it is desired to prevent the operator from moving the manipulator arm so as to strike obstacles such as the floor or lamps. By storing the position of obstacles in the computer and comparing these stored positions with the computed manipulator position, exaggerated processed force signals may be generated as the robotic manipulator approaches these obstacles. Thus, as an obstacle is approached, a large opposing directional force may be reflected in the hand controller so that the operator is guided to avoid impacting the obstacle with the manipulator.

Singularities may also be avoided by deriving the processed force signal from the manipulator configuration. A singularity results when the configuration of the manipulator arm is such that a certain small change in the spatial position of the gripper would produce large swings of segments of the manipulator arm. These large swings could be deleterious to the integrity of the arm. To guard against the operator moving the arm through singularities, the computer may store these singularities so that when, as a result of a hand controller position signal, the manipulator approaches a singularity, the computer generates large processed force signals so that the operator will naturally move the joystick around the singularity.

The details of the computer algorithm to accomplish all of the foregoing would be obvious to one skilled in the art.

The bandwidth of the force feedback loop is only limited by the noise filter 121 and the sampling frequency of the measured force signals from the force/moment sensor 104. Thus, the force feedback response may be made sufficiently fast to reflect all humanly perceptible changes in the force. Since a human hand can distinguish vibrations of up to about 10 Hertz, the bandwidth of the force feedback loop of this invention is chosen so as to reflect vibrations of at least this frequency.

While in the representative embodiment of FIGS. 4 and 5, the synthesized sensor signals are measured force/moment signals, it is possible to reflect other conditions in the hand controller. For example, environmental field sensors, such as temperature sensors or radiation sensors, may replace force/moment sensor 104. For any condition sensors, the vector representing the intensity and direction of the condition of concern at the gripper will be reflected in the hand controller as a force vector opposing deflection of the joystick by the operator.

For operation in the passive mode with the hand controller operating as a position controller, force feedback switch 162 is opened, position/velocity control switch 161 is set to position control mode and position feedback switch 160 is opened. Hand controller position signals from the potentiometers 131 input the computer 118 via analogue to digital converter 103b and are mapped and resolved (by blocks 134 and 135) to position control signals for the manipulator arm. No force signals are fed back to the hand controller. Further, if the hand controller is released, it remains in its current position since the position feedback loop is open circuited by virtue of position feedback control switch 160 being open.

For operation in the passive mode with the hand controller operating as a velocity controller, force feedback switch 162 is opened, position/velocity control switch 161 is set to velocity control mode and position feedback switch 160 is closed. Hand controller position signals from the potentiometers input the computer via the analogue to digital converter 103b and are mapped and resolved (by blocks 134 and 135) to velocity control signals for the manipulator arm. The hand controller position signals also input position feedback compensator 126 and are negatively fed back to the motors 130 of the hand controller through power amplifier 123 to provide a spring effect for the joystick as aforedescribed in connection with the active mode with velocity control.

The operation of the gravity compensation and viscous friction control loops, which operate in all four modes of operation of the hand controller, are now described.

The output of the tachometers 132 of the hand controller input viscous friction controller 127 (as well as position feedback compensator 126, as aforedescribed). The viscous friction controller produces a signal proportional to the directional rate measured by the tachometers which is negatively fed back to the motors of the hand controller through summing junction 122 and power amplifier 123. In this way, the more rapidly the joystick is moved by the operator, the greater the opposing torque created by the motors of the hand controller in consequence of the signals from the viscous friction controller. Thus, this circuit results in velocity feedback means which constrain the rate at which the operator will move the joystick.

The position signals from the potentiometers 131 of the hand controller input gravity compensation block 125 via the analogue to digital converter 103b. The output of the gravity compensator is summed with the force feedback signals at summing junction 120 and, hence, is fed back to the motors 130 of the hand controller via noise filter 121, summing junction 122, and power amplifier 123. The gravity compensator, by way of an algorithm well known to those skilled in the art, provides a feedback signal which negatives the effects of gravity on the hand controller. Thus, acting alone, the gravity compensator makes the joystick seem weightless in the hands of an operator.

This invention could have application to other machines, such as a remotely controlled drill press, in which case the operative part would be the drill head and the hand controller could have a single degree of freedom to move the head up and down.

We claim:

1. A human-in-the-loop control loop for a machine having a plurality of joints and an operative part, said plurality of joints adapted for moving said operative part, comprising:
   (a) a hand controller having at least one degree of freedom so as to be deflectable in order to provide hand controller position signals for moving said operative part, said hand controller, in each degree of freedom, controlling motion of said operative part along one path;
   (b) position mapping means to map each of said hand controller position signals to an operative part position command signal indicative of a position for said operative part along each of said at least one path;
   (c) velocity mapping means to map each of said hand controller position signals to an operative part velocity command signal indicative of a velocity for said operative part along each of said at least one path;
   (d) selector means to selectively activate said position mapping means and deactivate said velocity mapping means or activate said velocity mapping means and deactivate said position mapping means; and
   (e) resolving means responsive to said selector means for resolving operative part position command signals to joint command signals and operative part velocity command signals to joint command signals for controlling the movement of each of said joints.

2. The control loop of claim 1 further comprising torque generator means for generating torques to oppose deflection of said hand controller and hand controller position feedback means to generate difference signals between said hand controller position signals and selectable hand controller reference position signals and to negatively feed back a function of said difference signals to said torque generator means in order to generate torques opposing deflection of said hand controller from a reference position and switch means to turn said hand controller position feedback means on or off.

3. The control loop of claim 2 further including gravity compensation means to receive said hand controller position signals, to map said signals to gravity compensation signals proportional to the torque due to gravity on said hand controller at the hand controller position corresponding to said hand controller position signals and to negatively feed back a function of said gravity compensation signals to said torque generator means.

4. The control loop of claim 3 including operative part position indicating means for indicating the position of said operative part, memory means for storing an indication of certain positions of said operative part, comparator means for comparing the position of said operative part indicated by said operative part position indicating means with said stored indications of certain positions and for generating a comparison signal, and wherein said torque generator means is also responsive to said comparison signal whereby torques are generated to oppose certain deflections of said hand controller in order to avoid the movement of said operative part to positions represented by said stored positions.

5. The control loop of claim 1 wherein said hand controller has three degrees of freedom with each of said three degrees of freedom of said hand controller controlling motion of said operative part in one of the three spatial dimensions.

6. The control loop of claim 5 wherein said machine is a robotic manipulator and said operative part is the gripper of said robotic manipulator.

7. The control loop of claim 5 wherein said hand controller has three degrees of freedom and comprises a gimbal frame supporting a joystick rotatable about its longitudinal axis.

8. The control loop of claim 5 wherein said hand controller has three degrees of freedom and comprises:
   (a) upstanding supports rotatably supporting a cradle;
   (b) an arm received by said cradle such that the longitudinal axis of said arm is perpendicular to the axis of rotation of said cradle, said arm having a forearm rotatable about its longitudinal axis;
   (c) a joystick supported for rotation about its longitudinal axis by said forearm such that the longitudinal axis of said joystick is substantially perpendicular to the longitudinal axis of said forearm and is substantially perpendicular to the axis of rotation of said cradle.

9. The control loop of claim 2 wherein said hand controller has three degrees of freedom with each of said three degrees of freedom of said hand controller controlling motion of said operative part in one of the three spatial dimensions and including:
   sensing means responsive to a condition existing at said operative part for providing condition signals indicative of the intensity of said condition at said operative part in each of the three spatial dimensions;
   a condition feedback loop means comprising torque generator control signal production means for responding to said condition signals in order to produce torque generator control signals, said torque generator means for receiving a function of said torque generator control signals in order to generate torques to oppose deflection of said hand controller; and
   selector means to selectively close said condition feedback loop means.

10. The control loop of claim 9 wherein said sensing means comprise environmental field sensors.

11. The control loop of claim 9 wherein said sensing means comprise force sensors.

12. A human-in-the-loop control loop for a machine having a plurality of joints and an operative part, said plurality of joints adapted for moving said operative part, comprising:
   (a) a hard controller having at least one degree of freedom so as to be deflectable in order to provide hand controller position signals for moving said operative part, said hand controller, in each degree of freedom, controlling motion of said operative part along one path;
   (b) sensing means responsive to a condition existing at said operative part for providing condition signals indicative of the intensity of said condition at said operative part in a direction tangent to each said path;
   (c) a condition feedback loop means comprising torque generator control signal production means for responding to said condition signals in order to produce torque generator control signals and torque generator means for receiving a function of said torque generator control signals in order to generate torques to oppose deflection of said hand controller;
   (d) selector means to selectively close said condition feedback loop means;
   (e) position mapping means to map each of said hand controller position signals to an operative part position command signal indicative of a position for said operative part along each of said at least one path;
   (f) velocity mapping means to map each of said hand controller position signals to an operative part velocity command signal indicative of a velocity for said operative part along each of said at least one path;
   (d) selector means to selectively activate said position mapping means and deactivate said velocity mapping means or activate said velocity mapping means and deactivate said position mapping means; and
   (e) resolving means responsive to said selector means for resolving operative part position command signals to joint command signals and operative part velocity command signals to joint command signals for controlling the movement of each of said joint, whereby, when said condition feedback loop means is closed, the generated torque which opposes deflection of said hand controller in each degree of freedom of said hand controller is related to the intensity of said condition tangent to each said path.

13. The control loop of claim 12 wherein said machine is a robotic manipulator and said operative part is the gripper of said robotic manipulator.

14. The control loop of claim 12 further comprising hand controller position feedback means to generate difference signals between said hand controller position signals and selectable hand controller reference position signals and to negatively feed back a selectable function of said difference signals to said torque generator means in order to generate torques opposing deflection of said hand controller from a reference position and switch means to turn said hand controller position feedback means on or off.

15. The control loop of claim 14 including gravity compensation means to receive said hand controller position signals, to map said signals to gravity compensation signals proportional to the torque due to gravity on said hand controller at the hand controller position corresponding to said hand controller position signals and to negatively feed back a function of said gravity compensation signals to said torque generator means.

16. The control loop of claim 12 wherein said sensing means comprise environmental field sensors.

17. The control loop of claim 16 further comprising velocity feedback means to negatively feed back a function of the rate of movement of said hand controller in each degree of freedom of said hand controller to said torque generator means such that a torque proportional to the rate of movement of said hand controller in any given degree of freedom is generated to oppose the rate of deflection of said hand controller in said given degree of freedom.

18. A human-in-the-loop control loop for a robot arm terminating in a gripper and having a plurality of joints above said gripper, comprising:
   (a) a hand controller having three degrees of freedom so as to be deflectable in order to provide hand controller position signals for moving said gripper, each degree of freedom of said hand controller allowing said hand controller to control motion of said gripper in one spatial dimension;
   (b) position mapping means to map each of said hand controller position signals to a gripper position command signal indicative of a position for said gripper in the three spatial dimensions;
   (c) velocity mapping means to map each of said hand controller position signals to a gripper velocity command signal indicative of a velocity for said gripper in the three spatial dimensions;
   (d) selector means to selectively activate said position mapping means and deactivate said velocity mapping means or activate said velocity mapping means and deactivate said position mapping means;
   (e) resolving means responsive to said selector means for resolving gripper position command signals to joint command signals and gripper velocity command signals to joint command signals for controlling the movement of each of said joints;
whereby, when said position mapping means is activated, said joints are moved in such a way as to move said gripper to the position indicated by said hand controller and when said velocity mapping means is activated, said joints are moved in such a way as to move said gripper in the velocity indicated by said hand controller.

* * * * *